(12) United States Patent
Kim

(10) Patent No.: US 7,515,516 B2
(45) Date of Patent: Apr. 7, 2009

(54) RECORD MEDIUM, METHOD OF RECORDING IDENTIFICATION INFORMATION THEREOF, AND RECORDING/REPRODUCING METHOD THEREOF

(75) Inventor: Jin Yong Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 477 days.

(21) Appl. No.: 10/918,478

(22) Filed: Aug. 16, 2004

(65) Prior Publication Data

US 2005/0036418 A1 Feb. 17, 2005

(30) Foreign Application Priority Data

Aug. 14, 2003 (KR) .................. 10-2003-0056542

(51) Int. Cl.
*G11B 7/00* (2006.01)
(52) U.S. Cl. ................................... 369/53.22
(58) Field of Classification Search .............. None
See application file for complete search history.

(56) References Cited

U.S. PATENT DOCUMENTS

| 6,256,273 | B1 * | 7/2001 | Matsuda et al. ........ 369/44.27 |
| 6,330,215 | B1 * | 12/2001 | Lim ...................... 369/53.2 |
| 6,338,405 | B1 * | 1/2002 | Yoerg et al. ............ 206/308.1 |
| 6,866,884 | B2 * | 3/2005 | Hayashida et al. ........ 427/164 |
| 7,196,975 | B1 * | 3/2007 | Aikoh et al. ............ 369/13.12 |
| 2001/0020261 | A1 | 9/2001 | Ando et al. |

FOREIGN PATENT DOCUMENTS

| JP | 2001301872 | 10/2001 |
| JP | 200208268 | 1/2002 |
| JP | 2002092957 | 3/2002 |

OTHER PUBLICATIONS

International Search Report dated Apr. 5, 2005.

* cited by examiner

*Primary Examiner*—Joseph Feild
*Assistant Examiner*—Joseph Haley
(74) *Attorney, Agent, or Firm*—Harness Dickey & Pierce

(57) ABSTRACT

The present invention provides a method of recording identification information in an optical disc, by which specified disc identification information can be uniformly applicable to efficiently cope with the recording/reproducing of the optical disc. The present invention includes recording a disc identification information in a management area of the optical disc wherein the disc identification information identifies a disc type identified according to a disc surface protecting scheme including presence or non-presence of a protective coating, disc surface test completion, or cartridge use necessity.

18 Claims, 11 Drawing Sheets

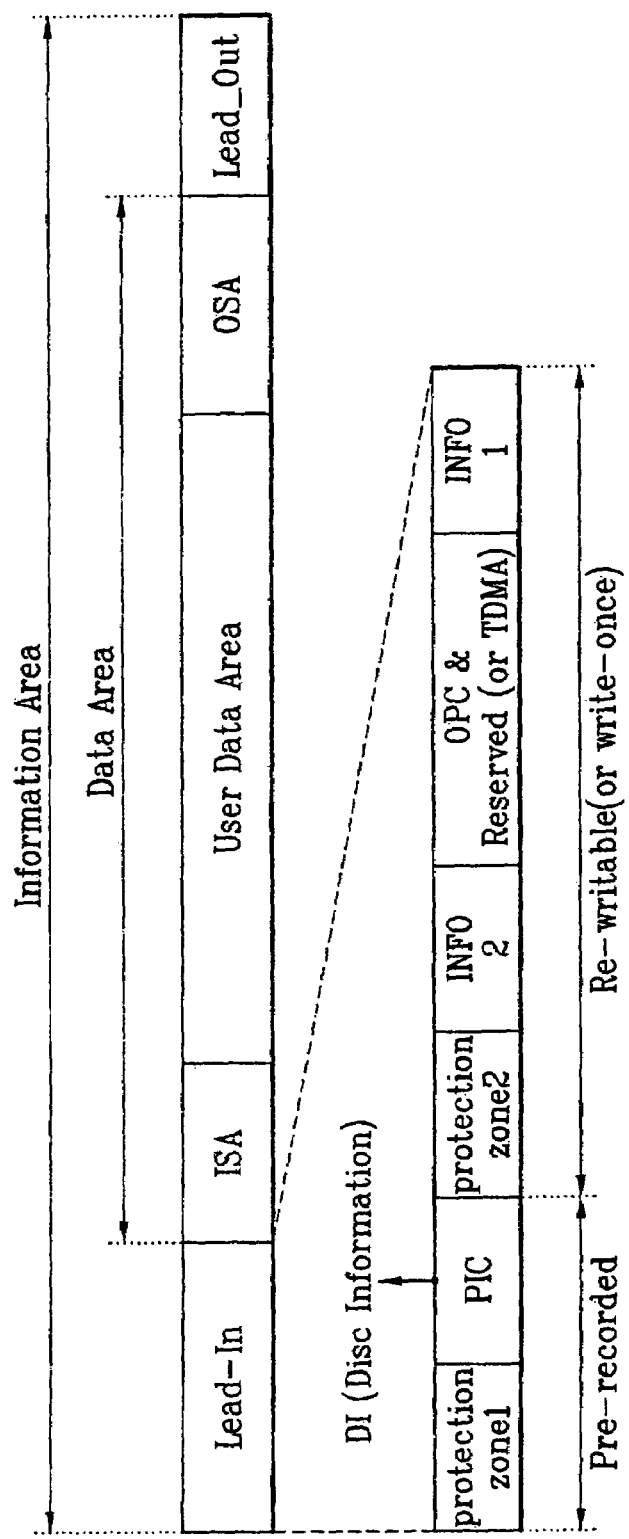

RECORD MEDIUM, METHOD OF RECORDING IDENTIFICATION INFORMATION THEREOF, AND RECORDING/REPRODUCING METHOD THEREOF

This application claims the benefit of the Korean Application No. 10-2003-0056542 filed on Aug. 14, 2004, which is hereby incorporated by reference.

BACKGROUND OF THE INVENTION

1. Field of the Invention

The present invention relates to a record medium, and more particularly, to a method of recording disc identification information within a management area of a recordable optical disc and an optical disc recording/reproducing method/apparatus using the same.

2. Discussion of the Related Art

Recently, a high-density optical record medium known as HD-DVD, is widely used to record and store high-definition video data and high-quality audio data. The Blu-ray disc (BD) represents a next generation HD-DVD technology. And, technological specifications are now being established for the global standardization of the Blu-ray disc, including standards for a write-once Blu-ray disc (BD-WO), rewritable Blu-ray disc (BD-RW), and read-only Blu-ray disc (BD-ROM).

Accordingly, it is needed to prepare new standardization coping with a case of high-speed (at least 2× speed) BD-RE or BD-WO. Specifically, in case of the currently discussed BD-RE or BD-WO, countermeasures for protecting a disc surface are being discussed in a manner of forming a protective coating or hard coating on the disc surface, specifying a disc surface test, specifying a use of cartridge optionally, and the like. Hence, it is needed to efficiently cope with disc types decided according to the disc surface protecting countermeasures in a high-density optical disc, which should be provided as standardized information to secure reciprocal compatibility.

SUMMARY OF THE INVENTION

Accordingly, the present invention is directed to a method of recording disc identification information in an optical disc that substantially obviates one or more problems due to limitations and disadvantages of the related art.

An object of the present invention is to provide a new method of recording disc identification information as specified information, by which recording/reproducing of an optical disc is efficiently performed from the recorded disc identification information.

Another object of the present invention is to provide a specified method of recording disc identification information coping with a disc type, by which reciprocal compatibility is provided between the discs of the family series.

A further object of the present invention is to provide a recording/reproducing method and apparatus thereof, by which data is efficiently recorded/reproduced on/from an optical disc using the recorded disc identification information.

Therefore, a method of recording disc identification information according to the present invention is characterized in that the disc identification information is recorded within a disc management area to identify a disc type according to a disc surface protecting scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording an identification information in an optical disc according to the present invention includes the step of recording a disc identification information in a management area of the optical disc wherein the disc identification information identifies a disc type identified according to a disc surface protecting scheme.

In another aspect of the present invention, an optical disc includes a management area and a data area, wherein an area for recording a disc identification information therein is provided to the management area and wherein the disc identification information identifies a disc type according to a disc surface protecting scheme.

In another aspect of the present invention, a recording/reproducing method in an optical disc includes the steps of reading an identification information recorded in a management are of the optical disc and checking presence or non-presence of a disc surface protecting scheme and if a generated data amount exceeds a reference on performing a recording/reproducing of the corresponding optical disc, providing a separate guide message according to a disc type identified the disc identification information.

In another aspect of the present invention, a recording/reproducing apparatus for an optical disc includes a control unit delivering a recording/reproducing command and a recording/reproducing unit receiving the recording/reproducing command, the recording/reproducing unit performing a recording/reproducing according to the recording/reproducing command in a manner of reading a disc identification information recorded in a management area of the optical disc and checking presence or non-presence of a disc surface protecting scheme from the disc identification information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram of a single-layer disc applicable to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to DVD-RAM/–RW/+RW/–R/+R and the like for example in the same manner.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, 'disc identification information' used in the description of the present invention means the information distinguishing a specific disc from other discs. As various discs show up lately, informations enabling to identify them respectively are needed. Specifically, the present invention is characterized in identifying a disc type interoperating with a disc protecting method.

Disc types applicable to the present invention are exemplarily explained in detail by referring to FIG. 1A and FIG. 1B as follows. For reference, Blu-ray discs (BD) are taken as examples of optical discs shown in FIG. 1A and FIG. 1B, which are identically applicable to a general optical disc.

Figure 1A:
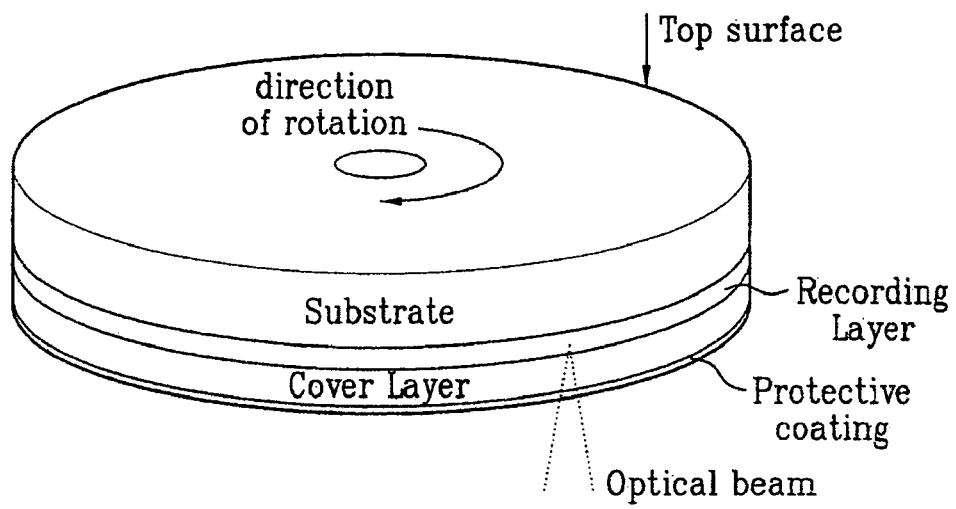
FIG. 1A and FIG. 1B are structural diagrams of a disc type for describing the present invention.
Figure 1B:
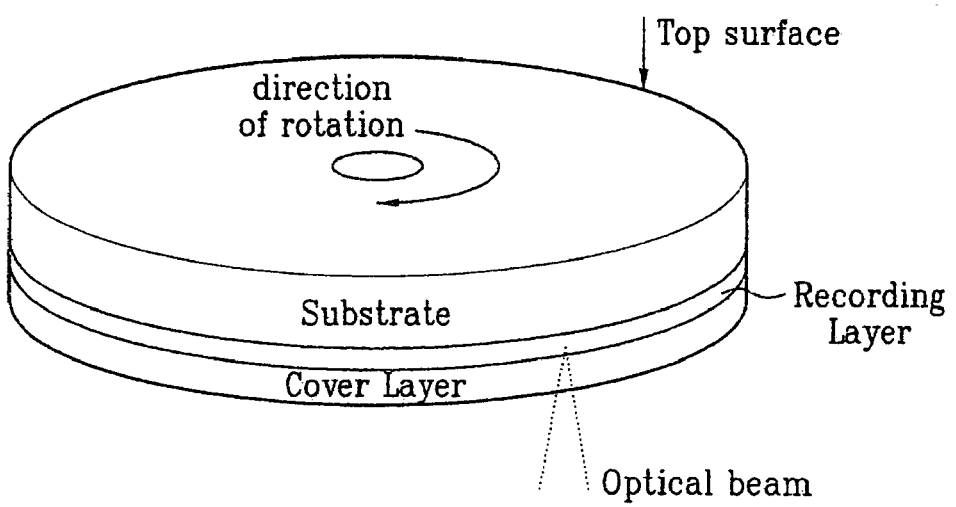

FIG. 1A and FIG. 1B show disc types, respectively.

Referring to FIG. 1A and FIG. 1B, a substrate, recording layer, and cover layer are sequentially stacked from a top surface of a disc. And, a bottom surface of the disc is optionally coated with a protective coating that can be called 'hard coating' as well.

Namely, FIG. 1A shows a case that a protective coating is formed and FIG. 1B shows a case that a protective coating is not formed. A disc surface protecting method as a reference of identifying a disc type according to the present invention is explained in the following.

First of all, an optical disc is a storage medium enabling to record vast amount of data within a limited size and is conveniently portable. A disc surface is always exposed to an external environment to become vulnerable to damages caused by various reasons. For instance, the disc surface may be contaminated by user's fingerprints due to a careless user and the like or can be scratched.

It is apparent that the damaged part of the disc surface will affect the recording/reproducing of the corresponding disc considerably. Specifically, in case of an optical beam of a high-density disc such as Blu-ray disc (BD) is much shorter than that of a previous disc, such a damaged part may become fatal to an operation of the disc.

In order to prevent the data loss caused by the external factors such as fingerprint, scratch, etc, the following countermeasures are provided by optical disc standards.

First of all, a protective coating, as shown in FIG. 1A, is provided to a disc surface. The presence of the protective coating plays a role in directly protecting the disc surface against the external factors. There exist various kinds of protective coatings. For instance, there is one protective coating persistent against either scratches or fingerprints. And, there is another protective coating persistent against both of the scratches and the fingerprints. These protective coatings are called hard coatings. Respectively.

Secondly, it is previously checked that a corresponding disc has strength exceeding a specific reference against the external factors via disc surface test in the course of manufacturing the corresponding disc. The checked disc is then provided to a user. Hence, a method of testing a disc surface should be previously provided as specified information. And, there may exist various kinds of disc surface tests. For instance, there may be an anti-scratch test, anti-fingerprint test, and anti-scratch/fingerprint test.

Thirdly, a cartridge may be provided to protect a disc from an external environment. The cartridge holds a disc therein to encapsulate so that a disc surface is fully cut off from outside. Yet, once the cartridge is loaded in a recording/reproducing apparatus (FIG. 10), a predetermined portion of the cartridge is open to provide a passage of an optical beam emitted from a pickup ('11' in FIG. 10), thereby enabling the corresponding recording/reproducing of the optical disc. Thus, the cartridge plays a role in protecting the disc. Specifically, a use of the cartridge may be occasionally mandatory for a recordable disc. Lately, a detachable cartridge is provided to load a disc therein if necessary to use.

Such a disc surface protecting countermeasure as a protective coating, disc surface test, and cartridge is utilized as a direct disc surface protecting method. And, there may be a secondary protecting method of protecting data within a disc in a manner of forming error-resistant data via signal processing within a recording/reproducing unit ('10' in FIG. 10) on performing the recording/reproducing on the disc or providing a defect management area within a disc to replace a defective area by a normal area.

The present invention relates to a protective coating, disc surface test, and cartridge for preventing a disc surface from being directly damaged. Namely, a disc manufacturer records disc identification information, which informs whether a corresponding disc is provided with at least one of the disc surface protecting countermeasures against the external factors or which disc surface protecting countermeasure is provided to the corresponding disc, in a management area within the disc, and an optical recording/reproducing apparatus (FIG. 10) then refers to the recorded disc identification information in recording/reproducing.

Hence, the major technical background of the present invention is characterized in that disc identification information for presence or non-presence of a protective coating, a completion of disc surface test, or a necessity of cartridge use is provided as specified information within a disc, whereby a user or control unit ('20' in FIG. 10) can utilize it in recording/reproducing.

FIG. 2 is a structural diagram of a single-layer disc having one recording layer according to the present invention.

Referring to FIG. 2, a lead-in area is provided as a management area on an inner circumference area of an optical disc, whereas a lead-out area is provided as a management area on an outer circumference area of the optical disc. Specifically, the inner circumference area of the optical disc is divided into a prerecorded area and a rewritable or write-once area.

The prerecorded area is an area where data was already written in the course of manufacturing the disc, whereby a user or system is unable to perform data writing on the prerecorded area at all. In BD-RE/WO, the prerecorded area is named PIC (permanent information and control data) area. And, disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

In the description of the present invention, 'disc information' means an area or information including various information for disc recording/reproducing. And, the disc information is a general name of the information within a prerecorded or embossed area to be provided to a disc user by a disc manufacturer. Yet, the disc information is provided not only to the prerecorded area but also to a recordable area according to a user's request. And, the disc information within the prerecorded or embossed area can be copied to the recordable area as well, for example.

Moreover, the 'disc information' applicable to the BD may be called 'physical format information' in DVD-RAM/−RW/+RW/−R/+R.

Hence, it is apparent that the technical background of the present invention be identically applicable to 'physical format information' in DVD-RAM/−RW/+RW/−R/+R. For convenience of explanation, 'disc information (hereinafter abbreviated DI)' corresponding to a case of Blu-ray disc (BD) is taken as an example in the following description of the present invention.

The present invention intends to record various identification information identifying a disc type according to a disc surface protecting scheme in a prerecorded. Since management information recorded in the prerecorded area is always read out to be taken into consideration for recording or reproducing. Hence, the prerecorded area is optimal for providing new disc identification information as specified information.

Specifically, in case of BD-RE/WO, the PIC area as the prerecorded area is recorded by biphased high-frequency modulated signals, the high-frequency modulated signals in the corresponding area are played back according to a specific playback method, and information is acquired from the corresponding playback. Yet, it is a matter of course that a recording method in the prerecorded area should be differently applied according to the corresponding disc specification, e.g., DVD specification, CD specification, etc.

Figure 3:
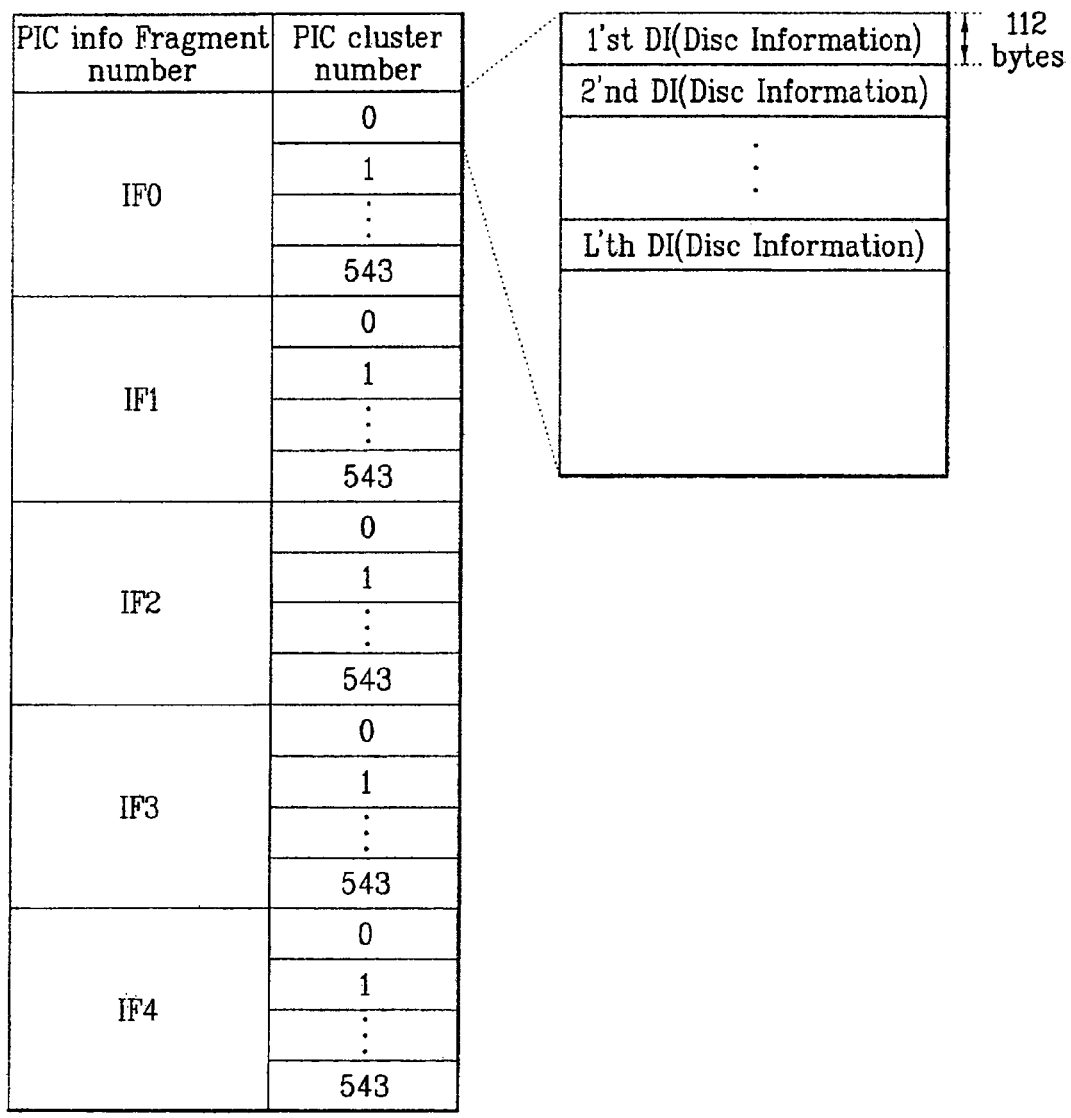
FIG. 3 is a diagram of a management area, in which disc identification information of the present invention is recorded.

FIG. 3 is a structural diagram of a PIC area in the disc shown in FIG. 2. As mentioned in the foregoing description, it means that information can be rearranged like the structure of the PIC area in FIG. 34 when the entire information within the high-frequency modulated PIC area is acquired.

A method of configuring disc information (DI) in the PIC area is explained in detail as follows.

In BD-RE/WO, 'one cluster' represents a minimum recording unit, five hundred forty-four clusters gather to construct one fragment as one upper recording unit, and total five fragments gather to form the PIC area. Disc information is recorded in a front head cluster of a first fragment IF0. The disc information is plurally recorded per recording layer and writing speed applicable by the corresponding optical disc, and one disc information includes one hundred twelve bytes. Specifically, disc information constructed with 112-bytes is called a disc information (DI) frame. Moreover, the same contents of the disc information are repeatedly recorded in each front head cluster of the rest fragments, thereby enabling to cope with loss of the disc information.

Information representing the corresponding recording layer, information representing writing speed, and write strategy information coping with the writing speed are recorded within the disc information each. Moreover, disc type identification information is recorded within the disc information as well. Hence, by utilizing such information in the recording or reproducing of the corresponding optical disc, it is able to provide optimal write power per disc type and per writing speed.

Various embodiments for a method of recording identification information including disc type information within the disc information according to the present invention is explained in detail by referring to FIGS. 4 to 11 as follows.

Figure 4:
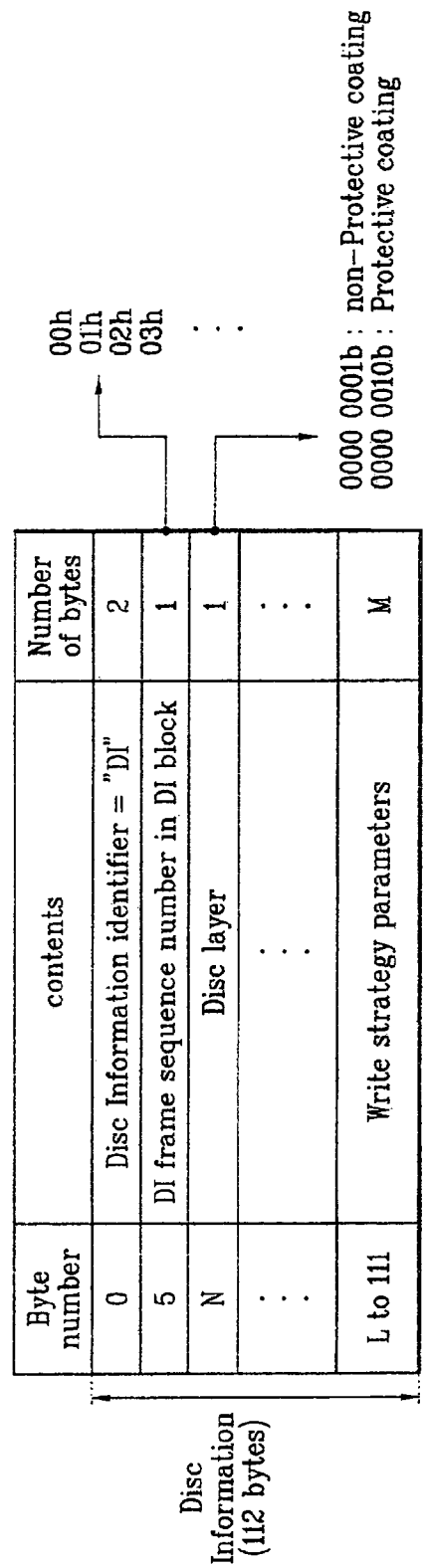
FIG. 4 is a diagram of recording disc identification information according to one embodiment of the present invention.

FIG. 4 is a diagram of recording disc identification information using disc information according to one embodiment of the present invention, in which disc identification information is recorded according to presence or non-presence of a protective coating as one of disc surface protecting schemes.

Referring to FIG. 4, a plurality of disc informations are recorded within a disc, a sequence number is given to each of the disc informations to decide a sequence order, and the sequence order is recorded by 1-byte. For instance, the corresponding information is recorded in $5^{th}$ byte within the disc information, which is named 'DI frame sequence number in DI block' field and is briefly indicated by '00h, 01h, 02h, 03h . . .'. Namely, if the information of the $5^{th}$ byte is '00h', it means $1^{st}$ disc information. And, if the information of the $5^{th}$ byte is '03h', it means $4^{th}$ disc information.

And, a write strategy (WS) interoperating with the speed meant by the corresponding disc information is recorded in a specific area, which is named 'Write Strategy parameters' field by $L^{th}$~$111^{th}$ bytes, within the disc information. Moreover, identification information enabling to identify a disc type depending on a presence or non-presence of a protective coating on a disc surface is recorded in another specific area, which is named 'Disc layer' field by $N^{th}$ byte, within the disc information.

The identification information allocates a specific recognition value to each of the disc types to be defined as follows. For instance, if '0000 0001b', the specific recognition value means a non-protective coating disc. If '0000 0010b', the specific recognition value means a protective coating disc.

Hence, in case of the non-protective coating disc, a user should be more cautious to use the corresponding disc. And, a recording/reproducing unit ('10' in FIG. 10) enables to inform the user of such a fact with a guide message form to enhance use efficiency of the disc. An optical disc recording/reproducing method via the recording/reproducing unit ('10' in FIG. 10) will be explained in detail later.

Figure 5:
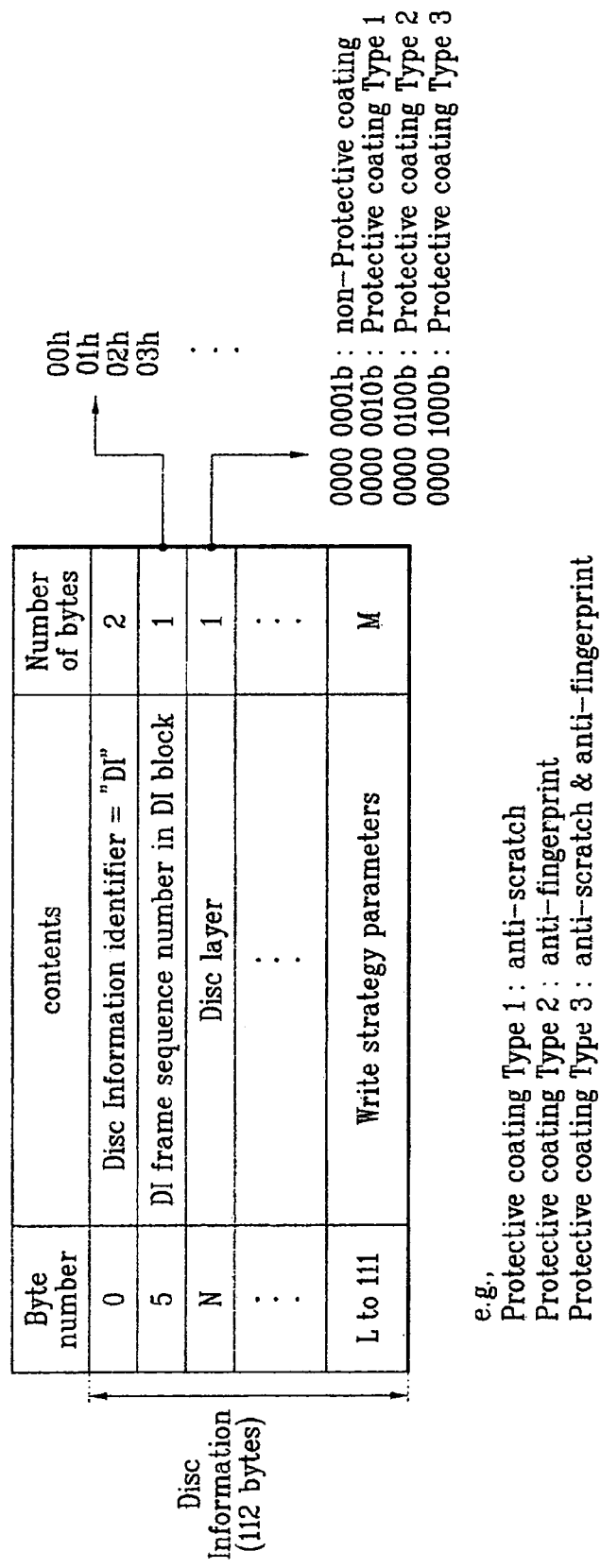
FIG. 5 is a diagram of recording disc identification information according to another embodiment of the present invention.

FIG. 5 is a diagram of recording disc identification information using disc information according to another embodiment of the present invention, in which a protective coating type can be identified in case of a protective coating disc.

Referring to FIG. 5, it can be defined in the following manner. If 'Disc layer' field in $N^{th}$ byte of disc information is '0000 0001b', it means a non-protective coating disc. If 'Disc layer' field in $N^{th}$ byte of disc information is '0000 0010b', '0000 001b', or '0000 1000b', it means a protective coating disc as well as identification information enabling to identify a protective coating type each. For instance, if '0000 0010b', it means an anti-scratch protective coating is formed. If '0000 0100b', it means an anti-fingerprint protective coating is formed. If '0000 1100b', it means an anti-scratch & anti-fingerprint protective coating is formed to prevent both fingerprint and scratch. Specifically, if the $N^{th}$ byte is set to '0000 1000b', it can be interpreted as a protective coating enabling to protect a disc surface against all external factors.

Hence, in case of forming a protective coating on a disc surface, a disc manufacturer enables to record information of a type of the corresponding protective coating, and more particularly, information informing which external factor(s) can be prevented within disc information. In case of the protective coating indicated by '0000 1000b' to be resistant against the entire external factors, the recorded information can be utilized as information informing that the corresponding disc can be used as a non-cartridge or bare disc. Besides, $5^{th}$ and Lth~$111^{th}$ bytes correspond to those in FIG. 4, of which explanation is skipped.

Figure 6:
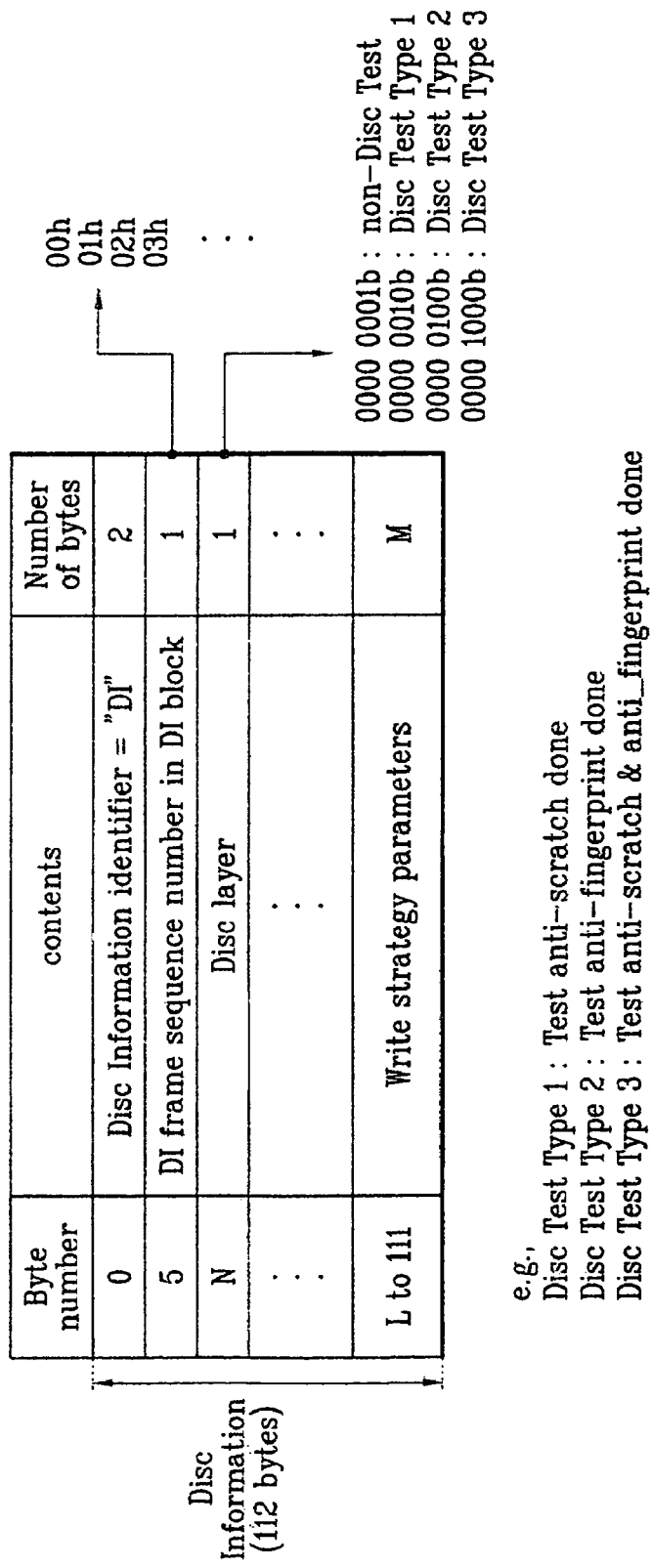
FIGS. 6 to 9 are diagrams of recording disc identification information according to a further embodiment of the present invention.

FIG. 6 is a diagram of recording disc identification information using disc information according to a further embodiment of the present invention, in which a disc surface is tested by a specified method as one of the disc surface protecting countermeasures to record disc type information according to a result of the test.

In this embodiment of the present invention, 'disc surface test' is to record information indicating whether a final disc surface such as a cover layer and protective layer is tested by a specified test method regardless of presence or non-presence of a protective coating. Hence, completion of the test is as good as proving that the corresponding disc is resistant against a specific external factor.

Referring to FIG. 6, it can be defined in the following manner. If 'Disc layer' field in $N^{th}$ byte of disc information is '0000 0001b', it means 'non-Disc Test' failing to perform a disc surface test. If 'Disc layer' field in $N^{th}$ byte of disc information is '0000 0010b', '0000 0100b', or '0000 1000b', it means a disc surface test is performed as well as identification information enabling to identify a protective coating type each. For instance, if '0000 0010b', it means an anti-scratch test is performed as a disc surface test. If '0000 0100b', it means an anti-fingerprint test is performed as a disc surface test. If '0000 1100b', it means an anti-scratch & anti-fingerprint test is performed as a disc surface test against both fingerprint and scratch. Specifically, if the $N^{th}$ byte is set to '0000 1000b', it can be interpreted that the disc surface test against all external factors is performed.

Figure 7:
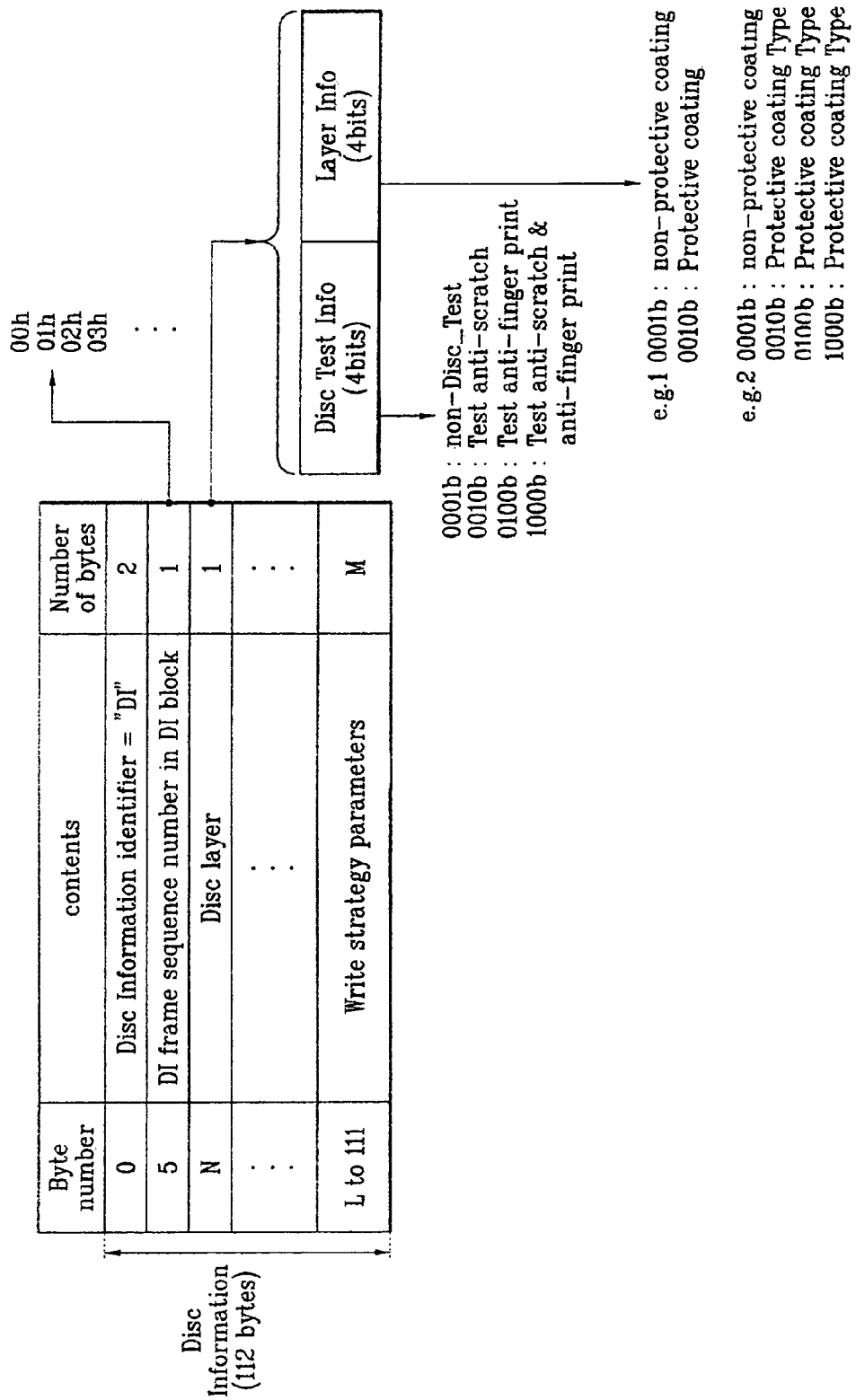

Moreover, a method of identifying a disc type according to a disc surface test like FIG. 7 can be recorded together with a case of identifying a disc type according to presence or non-presence of the protective coating in FIG. 4 or FIG. 5. For instance, by dividing 'Disc layer' field of $N^{th}$ byte of disc information by 4-bits each, information for presence or non-presence of the disc surface test is provided to a first 4-bits and another information indicating presence or non-presence of the protective coating is provided to a second 4-bits. In doing so, the second 4-bits can indicate the presence or non-presence of the protective coating like FIG. 4 (e.g.1) or the type of the protective coating like FIG. 5 (e.g.2).

Figure 8:
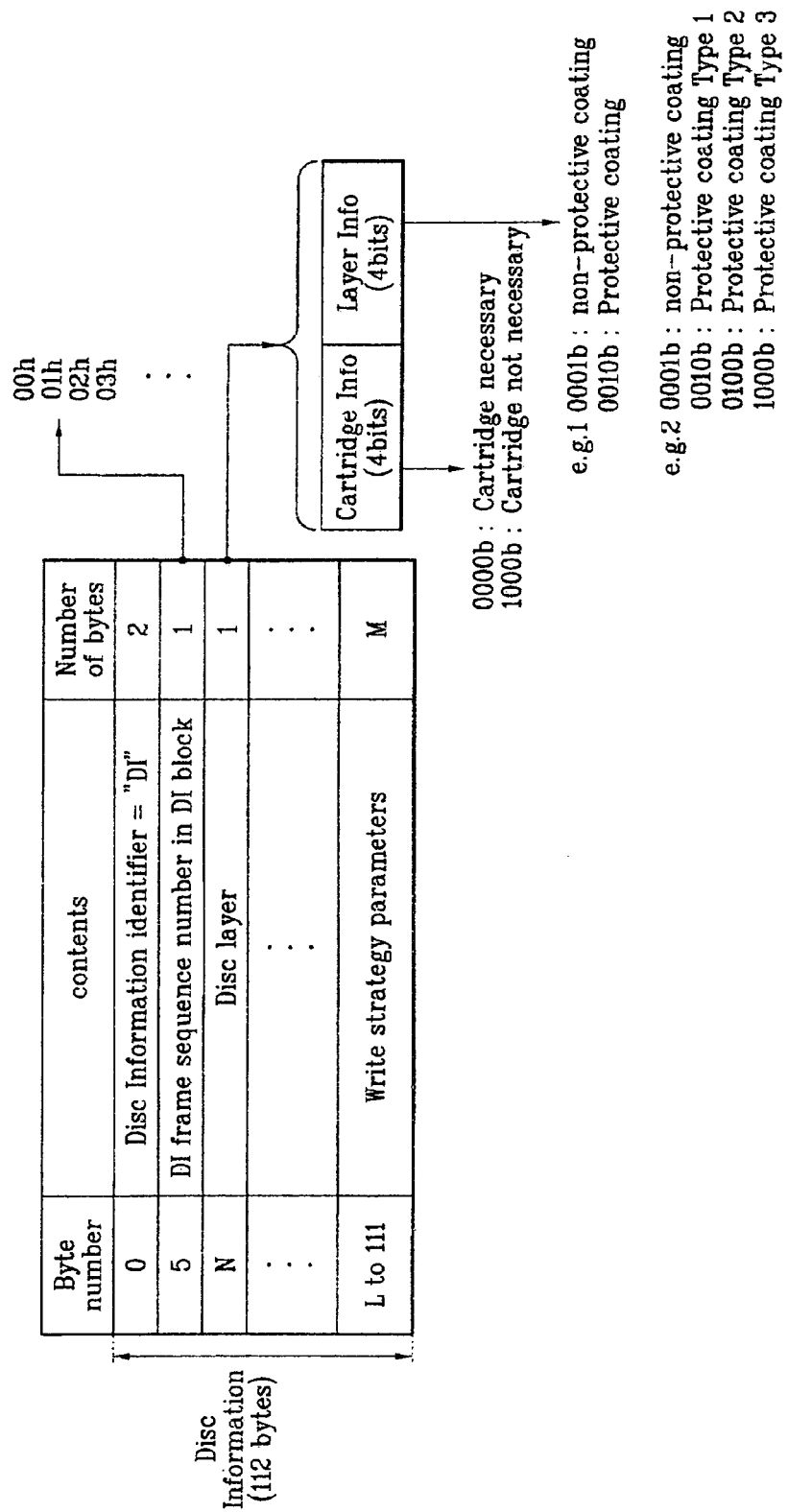

FIG. 8 is a diagram of recording disc identification information using disc information according to another further embodiment of the present invention, in which disc type information is recorded according to presence or non-presence of necessity of using a cartridge as one of the disc surface protecting countermeasures.

As mentioned in the foregoing description, cartridge use is one of the disc surface protecting countermeasures and can be individually used regardless of the protective coating. In case that the protective coating fails to exist, the cartridge use is necessary in general. Yet, the information about the presence or non-presence of the protective coating may not coincide with the information about the presence or non-presence of the necessity of the cartridge use. Hence, the information for the necessity of the cartridge use needs to be separately provided.

Hence, a method of identifying a disc type according to the necessity of the cartridge use like FIG. 8 can be recorded together with a case of identifying a disc type according to presence or non-presence of the protective coating in FIG. 4 or FIG. 5. For instance, by dividing 'Disc layer' field of $N^{th}$ byte of disc information by 4-bits each, information for the necessity of the cartridge use is provided to a first 4-bits and another information indicating presence or non-presence of the protective coating is provided to a second 4-bits. In doing so, if the first 4-bits is '0000b', it means the cartridge needs to be used. If the first 4-bits is '0001b', it means the cartridge need not be used. Moreover, the second 4-bits can indicate the presence or non-presence of the protective coating like FIG. 4 (e.g.1) or the type of the protective coating like FIG. 5 (e.g.2).

Figure 9:
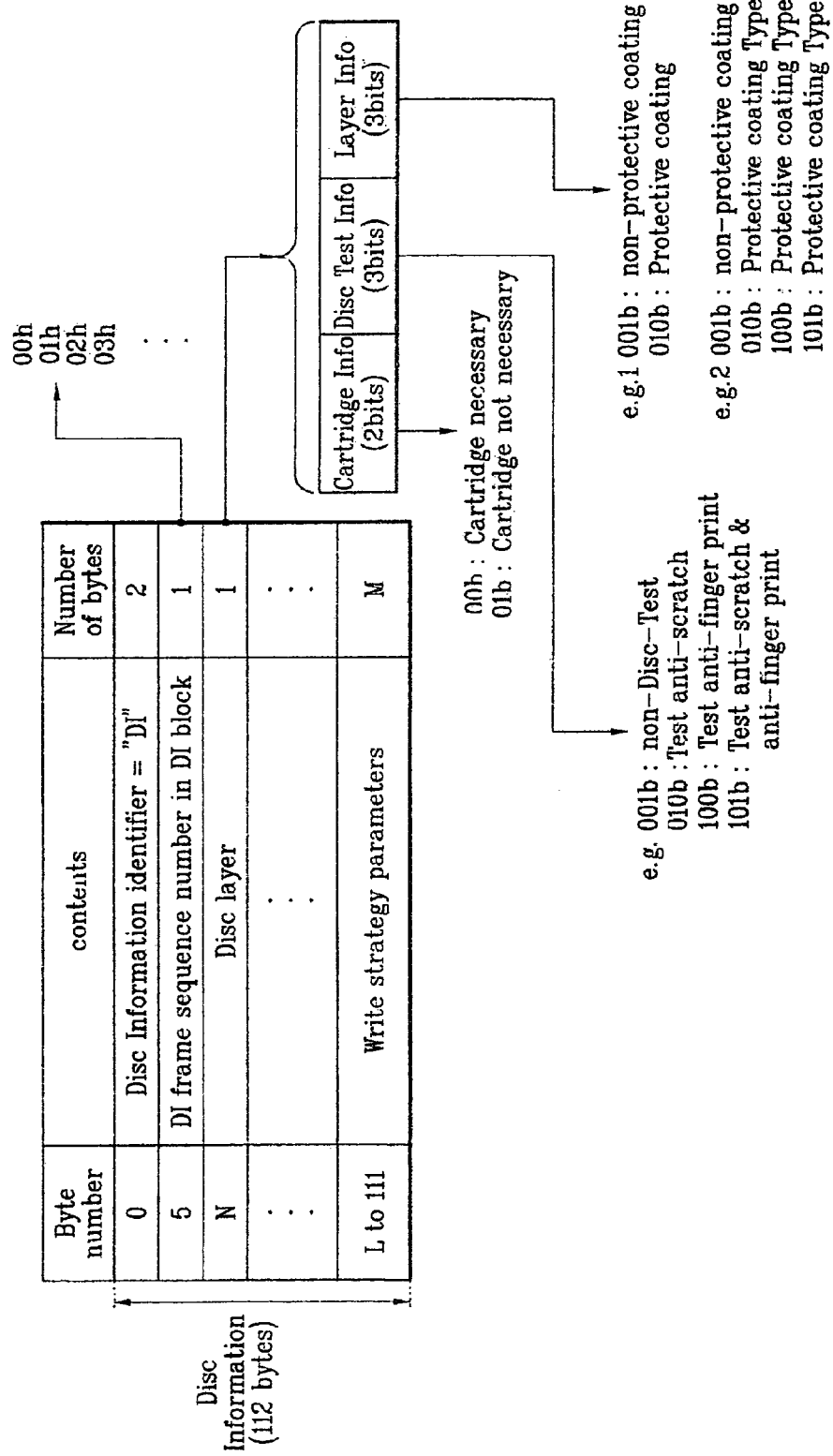

FIG. 9 is a diagram of recording disc identification information using disc information according to another further embodiment of the present invention, in which disc type information combining presence or non-presence of a protecting coating, presence or non-presence of a disc surface test, and presence or non-presence of necessity of using a cartridge is recorded as disc identification information within disc information.

Referring to FIG. 9, it is defined that presence or non-presence of necessity of using a cartridge, presence or non-presence of completion of a disc surface test, and presence or non-presence of a protecting coating are recorded in a first 2-bits, second 3-bits, and third 3-bits of 'Disc layer' field of $N^{th}$ byte of disc information. And, by applying the disc type identifying method adopted in FIGS. 4 to 8, each area is recorded.

Namely, if the $N^{th}$ byte is '00 001 001b', it means both of the non-presence of the protective coating on the corresponding disc and the non-presence of the completion of the disc surface test to define that the corresponding disc needs to use the cartridge. If '01 101 101b' is written in the $N^{th}$ byte, it means the presence of the protective coating taking all external factors (Type3) and the completion of the entire disc surface tests to define that the corresponding disc needs not to use the cartridge.

As can be understood by the various methods of recording the disc type information described in FIGS. 4 to 9, the disc type information of the present invention as specified information between a disc manufacturer and a recording/reproducing apparatus (FIG. 10) is recorded within the disc information as a management area of the disc. Hence, the recording/reproducing apparatus (FIG. 10) recognizes the current state of the disc correctly to provide a guide message for using the disc to a final user on reproducing the disc, thereby enabling to enhance efficiency of using the disc.

Meanwhile, a recording/reproducing method and apparatus of an optical disc using the above-recorded disc identification information recorded within the disc information are explained in the following description of FIG. 10 and FIG. 11.

Figure 10:
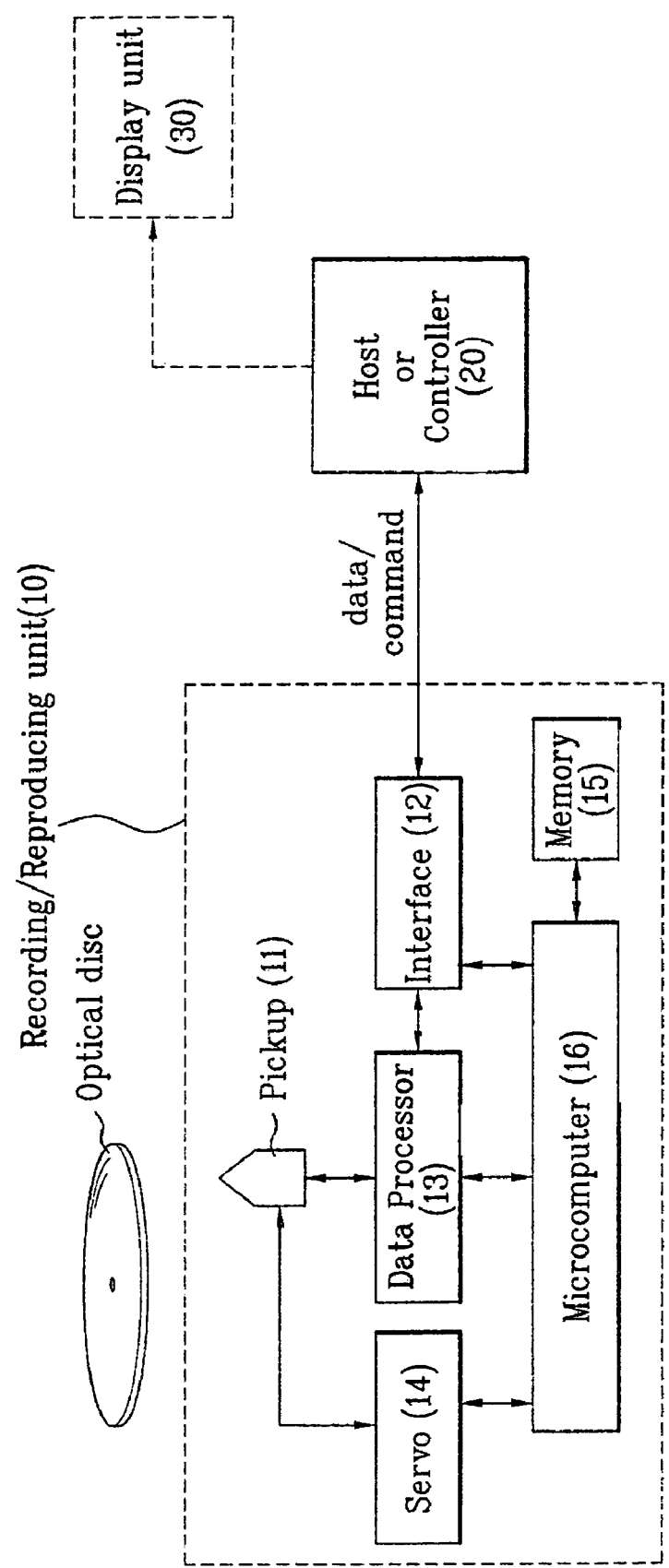
FIG. 10 is a block diagram of an optical disc recording/reproducing apparatus applicable to the present invention.
Figure 11:
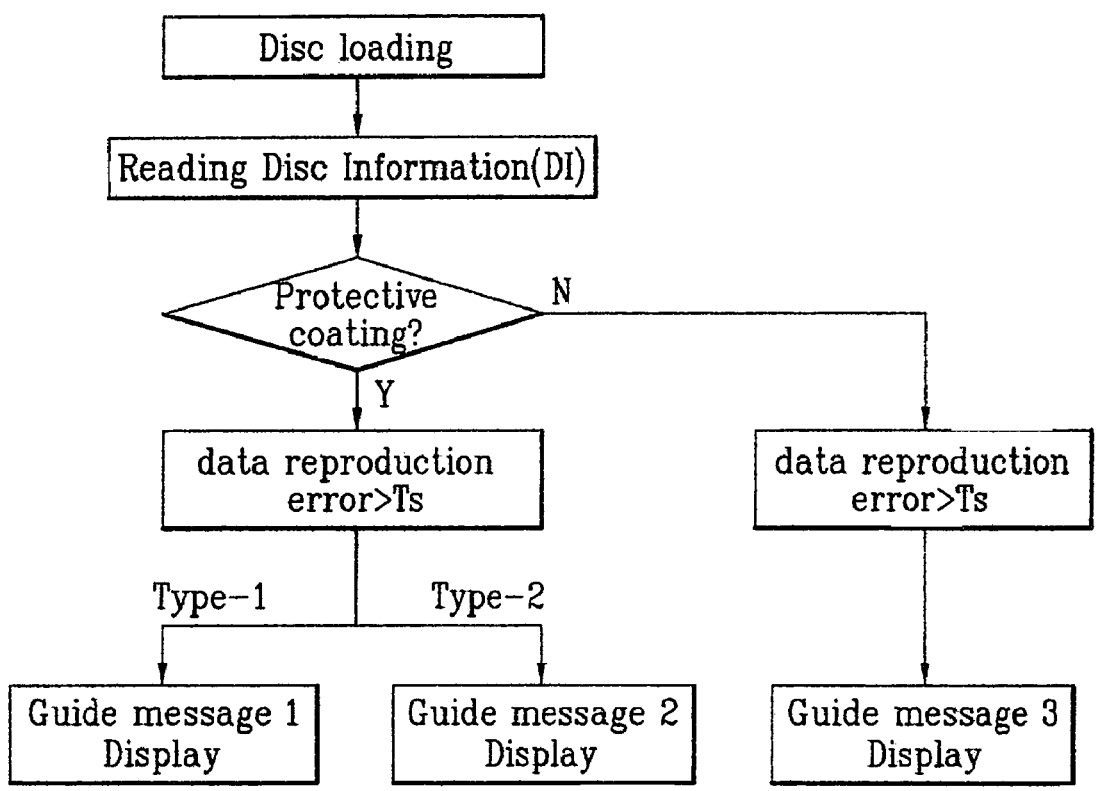
FIG. 11 is a flowchart of a recording/reproducing method using disc identification information according to the present invention.

FIG. 10 is a block diagram of an optical disc recording/reproducing apparatus applicable to the present invention.

Referring to FIG. 10, a recording/reproducing apparatus according to the present invention includes a recording/reproducing unit 10 carrying out recording/reproducing on an optical disc and a control unit 20 controlling the recording/reproducing unit 10. The control unit 20 gives a recording or reproducing command for a specific area, and the recording/reproducing unit 10 carries out the recording/reproducing on the specific area according to the command of the control unit 20.

Specifically, the recording/reproducing unit 10 includes an interface unit 12 performing communications with an external device, a pickup unit 11 directly recording data on the optical disc or reproducing the data, a data processor 13 receiving a reproducing signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing various informations including a management information and data, and a microcomputer 16 responsible for controlling the above-described elements within the recording/reproducing unit 10. Besides, in case that the apparatus fails to include the control unit 20, it is able to design the apparatus in a manner that a microcomputer 16 enables to perform the functions of the control unit 20.

A reproducing process of an optical disc according to the present invention is explained in detail by referring to FIG. 10 and FIG. 11 as follows.

First of all, once an optical disc is loaded in the recording/reproducing apparatus, the entire disc management information within the disc is read out to be temporarily stored in the memory 15 of the recording/reproducing unit 10. And, various kinds of the disc management information are utilized for the recording/reproducing of the optical disc. Specifically, the management information stored in the memory includes the disc information of the present invention, whereby the disc type information recorded within the disc information is read out to be stored in the memory 15 as well. Moreover, the disc type information interoperates with the presence or non-presence of the protective coating, presence or non-presence of the disc surface test, or presence or non-presence of the necessity of the cartridge use to be decided and recorded.

Once the control unit 20 delivers the recording/reproducing command for recording/reproducing a signal recorded in a specific location of the currently loaded optical disc to the recording/reproducing unit 10, the recording/reproducing unit 10 performs the recording/reproducing command of the control unit 20 in a following manner. Namely, the recording/reproducing unit 10 performs the corresponding recording/reproducing using the various management information previously read to be stored. In case that an error exceeding a predetermined reference Ts takes place in the course of the recording/reproducing, the corresponding occurrence can be provided to a user via display device 30. In providing the corresponding occurrence, it is also able to guide a separate countermeasure according to the previously read disc type.

For instance, when an error exceeding a predetermined reference Ts occurs in case that a disc type corresponds to 'non-protective coating', the control unit 20 can provide 'Guide message-3' displaying that 'cautious of high probability of error occurrence due to non-protective coating disc'.

When an error exceeding a predetermined reference Ts occurs in case that a disc type corresponds to 'protective coating' and 'anti-scratch protective coating' (Type1), the control unit 20 can provide 'Guide message-2' displaying that 'Cleanse a possibly-contaminated disc surface by cloth or spray softly'.

When an error exceeding a predetermined reference Ts occurs in case that a disc type corresponds to 'protective coating' and 'anti-fingerprint protective coating' (Type2), the control unit 20 can provide 'Guide message-2' displaying that 'Check a possibly-scratched disc surface'.

The guide message-1, -2, and -3 are just exemplary, and it is apparent that various guide message can be provided in various ways and that a guide message according to presence or non-presence of disc surface test or cartridge use necessity can be provided as well as the presence or non-presence of the protective coating.

Accordingly, the present invention provides the various specified methods of recording disc identification information according to disc surface protecting schemes in a management area of a high-density optical disc, thereby enabling to efficiently cope with the recording/reproducing of the optical disc by utilizing the recorded identification information.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of recording identification information in an optical disc, comprising:
    recording disc identification information in a management area of the optical disc, the disc identification information identifying a disc type identified according to a disc surface protecting scheme, the disc surface protecting scheme including information for a disc protective coating, where the disc identification information identifies one of a presence and non-presence of the protective coating and a type of the protective coating, the type of the protective coating being associated with at least one of anti-fingerprint and anti-scratch.

2. The method of claim 1, wherein,
    the disc surface protecting scheme further includes information for a disc surface test, and
    the disc identification information further identifies whether the disc surface test is completed.

3. The method of claim 2, wherein the disc surface test is an anti-scratch test.

4. The method of claim 2, wherein the disc surface test is an anti-fingerprint test.

5. The method of claim 2, wherein the disc surface test is an anti-scratch and anti-fingerprint test.

6. A method of recording identification information in an optical disc, comprising:
    recording disc identification information in a management area of the optical disc, the disc identification information identifying one of a presence and non-presence of a necessity of a cartridge use and a disc type identified according to a disc surface protecting scheme, the disc surface protecting scheme including information for the cartridge use.

7. The method of claim 6, wherein,
    the disc surface protecting scheme further includes information for a protective coating and a disc surface test, and
    the disc identification information indicates one of a presence and non-presence of the protective coating and one of a presence and non-presence of a completion of the disc surface test.

8. The method of claim 7, wherein the disc identification indicates the presence of the protective coating and a message is displayed that a cartridge is not necessary.

9. The method of claim 7, wherein the disc identification indicates both the presence of the protective coating and the presence of the disc surface test completion, and a message is displayed that a cartridge is not necessary.

10. The method of claim 1, wherein the disc identification information is prerecorded in a prerecorded area.

11. The method of claim 1, wherein the disc identification information is recorded in a recordable management area within the optical disc.

12. An optical disc comprising:
a data area; and
a management area including an area for recording disc identification information, where the disc identification information identifies a disc type according to a disc surface protecting scheme, the disc surface protecting scheme including information for a protective coating, and the disc identification information identifying one of a presence and non-presence of the protective coating and a type of the protective coating, the type of the protective coating being associated with at least one of anti-fingerprint and anti-scratch.

13. The optical disc of claim 12, wherein the disc identification information further identifies whether a disc surface test is completed.

14. The optical disc of claim 12, wherein the disc identification information further identifies whether a cartridge is necessary.

15. The optical disc of claim 14, wherein the disc identification information indicates that the cartridge is not necessary if the optical disc includes the protective coating and a disc surface test is completed.

16. An optical disc, comprising:
a data area for storing use data; and
a management area for storing disc identification information, the disc identification information indicating whether a cartridge is necessary and a disc type based on a disc surface protecting scheme, where the disc surface protecting scheme includes information for at least the cartridge.

17. The optical disc of claim 16, wherein the disc identification information further indicates whether a disc surface test is completed.

18. The optical disc of claim 16, wherein the disc identification information indicates that the cartridge is not necessary if the optical disc Includes the protective coating and a disc surface test is completed.

* * * * *